United States Patent
Kao et al.

(10) Patent No.: US 8,033,709 B2
(45) Date of Patent: Oct. 11, 2011

(54) LIGHT GUIDE PLATE, AND BACKLIGHT MODULE AND LIQUID CRYSTAL DISPLAY INCORPORATING SAME

(75) Inventors: Ko-Chia Kao, Jiuru Shiang (TW); Chih-Kuang Chen, Kaohsiung (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 11/461,801

(22) Filed: Aug. 2, 2006

(65) Prior Publication Data

US 2007/0217224 A1    Sep. 20, 2007

(30) Foreign Application Priority Data

Mar. 15, 2006  (TW) ............................. 95108785 A

(51) Int. Cl.
*F21V 7/04* (2006.01)
(52) U.S. Cl. ........................ 362/621; 362/628
(58) Field of Classification Search ........... 362/600–634
See application file for complete search history.

(56) References Cited

U.S. PATENT DOCUMENTS

| | | | | |
|---|---|---|---|---|
| 6,065,845 A | * | 5/2000 | Miyazaki | 362/612 |
| 6,435,686 B1 | * | 8/2002 | Gotou et al. | 362/623 |
| 6,601,962 B1 | * | 8/2003 | Ehara et al. | 362/612 |
| 7,011,440 B2 | * | 3/2006 | Leu et al. | 362/621 |
| 2003/0076669 A1 | * | 4/2003 | Itoh et al. | 362/31 |
| 2005/0185915 A1 | * | 8/2005 | Yu et al. | 385/146 |
| 2006/0072339 A1 | * | 4/2006 | Li et al. | 362/612 |

FOREIGN PATENT DOCUMENTS

CN        1601353        3/2005

OTHER PUBLICATIONS

Chinese language office action dated Dec. 22, 2009.
English language translation of abstract and pertinent parts of TW 200636355.
English language translation of abstract and pertinent parts of TW M282191.
English language translation of abstract of TW 2005535506.
English language translation of relevant parts of CN 1601353.

* cited by examiner

*Primary Examiner* — William Carter
(74) *Attorney, Agent, or Firm* — Thomas, Kayden, Horstemeyer & Risley, LLP

(57) ABSTRACT

A light guide plate for a liquid crystal display is disclosed. The light guide plate is adapted for use in a side-light emission type of backlight module. The light guide plate comprises a light incidence face that has at least one surface having at least one annular protrusion or recess, thereby enhancing the capability of light diffusion, uniformity of the light distribution, as well as promoting brightness.

14 Claims, 4 Drawing Sheets

LIGHT GUIDE PLATE, AND BACKLIGHT MODULE AND LIQUID CRYSTAL DISPLAY INCORPORATING SAME This application benefits from the priority of Taiwan Patent Application No. 095108785 filed on Mar. 15, 2006.

CROSS-REFERENCES TO RELATED APPLICATIONS

Not applicable.

BACKGROUND OF THE INVENTION

1. Field of the Invention

The present invention relates to a light guide plate for use in a liquid crystal display. In particular, the invention relates to a light guide plate for use in a liquid crystal display that has a sidelight emission type of backlight module.

2. Descriptions of the Related Art

LCDs (Liquid crystal displays) are lightweight and thin. Today, LCDs are greatly substituted for CRT (cathode ray tube) monitors.

Because the liquid crystal panels of the LCDs are not self-illuminant, lights need to be supplied by a backlight module. These lights can partially penetrate through the liquid crystal panel to form images. In addition, voltages are needed for the liquid crystal panel to twist or tilt the liquid crystals. Consequently, the backlight module serves as the illuminant element in the LCD. The light quality of the backlight module, which is associated with the property of the tilted liquid crystals in the liquid crystal panel and the appropriate control of switch elements, determine brightness, performance uniformity and image quality of the LCDs.

Presently, the backlight modules of side light emission type are widely applied in LCD TVs, desktop LCD monitors, LCD display on mobile phones and so on. This particular type of backlight modules comprises a light guide plate and a light source. The light incidence face of the light guide plate is substantially perpendicular to the light emission face of the light guide plate. The light source is disposed adjacent to the light incidence face. When the lights are guided into the light incidence face, the lights are then reflected onto the light emission face with the guidance of the light guide plate. Subsequently, the lights that are emitted out from the light emission face are provided onto the liquid crystal panel which is disposed above the backlight module. The aforesaid light source is, but not limited to, an LED (light emitting diode), a fluorescent lamp, or a cold cathode fluorescent lamp.

Unfortunately, indispensable total reflections occur when the lights initially travel through the light guide plate. The total reflections of the light guide plate delay the lights from emitting out of the light emission face, causing inferior brightness and uniformity levels of light output. To remedy the situation, it is necessary to reinforce the brightness and uniformity of the light supplier, i.e. the backlight module, by additionally providing an optical sheet, or by modifying the design of the light guide plate. However, the existing measures of improvement increase complexity in the manufacturing and assembly of the product.

Given the above complications, there is a need to develop a novel light guide plate, a backlight module and a liquid crystal display comprising the same.

SUMMARY OF THE INVENTION

The primary objective of this invention is to provide a light guide plate, wherein the light incidence face of the light guide plate is formed with at least one surface. The surface is defined by at least one annular protrusion or recess to enhance diffusive capability and uniformity of lights which are guided into the light guide plate.

Another objective of this invention is to provide a backlight module comprising the above-mentioned light guide plate. At the least, a surface should be formed by the light incidence face of the light guide plate. The surface is also defined by at least one annular protrusion or recess, thereby enhancing light brightness and uniformity of the backlight module.

Yet a further objective of this invention is to provide an LCD comprising the above-mentioned backlight module. The light guide plate of the backlight module includes a light incidence face formed with at least one surface which is defined by at least one annular protrusion or recess, thereby creating uniform luminosity and enhancing the entire brightness of the LCD.

The detailed technology and preferred embodiments implemented for the subject invention are described in the following paragraphs accompanying the appended drawings for people ordinarily skilled in this field to well appreciate the features of the claimed invention.

DESCRIPTION OF THE PREFERRED EMBODIMENT

Figure 1:
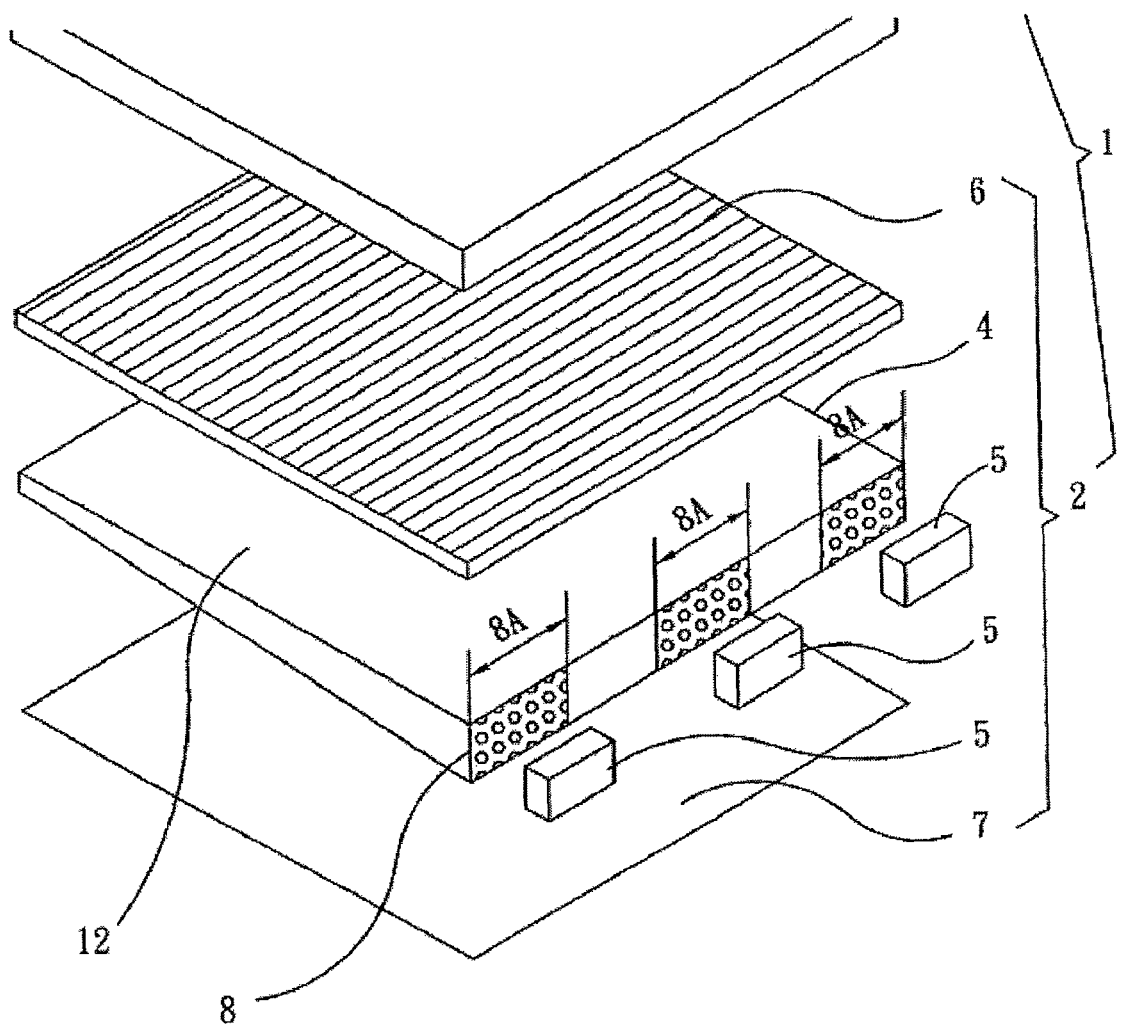
FIG. 1 is a schematic view illustrating the first embodiment of the present invention.

FIG. 1 is an exploded view illustrating the LCD of the first embodiment of the present invention in a schematic manner. The LCD 1 has a liquid crystal panel 3, an optical sheet 6, and a backlight module 2 disposed under the liquid crystal panel 3. The liquid crystal panel 3 substantially comprises an upper substrate, a lower substrate (not shown), and a liquid crystal layer (not shown) disposed therebetween. The upper and lower substrates could respectively be a color filter substrate and an active array substrate. The backlight module 2 further comprises a light guide plate 4 and at least one light source. It is preferable, as shown in the figure, to have a plurality of light sources.

For example, the plurality of light sources can be LEDs (light emit diodes) 5. In this embodiment, three LEDs 5 are illustrated. The LEDs 5 could be red, green, blue, white, or the combination thereof. It is understandable that the quantity, dimension, applied material, and colors of the LEDs 5 are not limited and could be freely adjusted according to the actual needs. Nevertheless, a preferred material of the light guide plate 4 is Poly (3-hydroxybutyrate-co-3-hydroxyvalerate) (PMMA).

The light guide plate 4 has an incidence face 8 and an emission face 12 (i.e. the end face which faces the users). In general, the emission face 12 is substantially perpendicular to the incidence face 8. The incidence face 8 has at least one incidence area 8A and at least one surface 80 which formed along the incidence area 8A. The embodiment as shown illustrates the plurality of surfaces 80 which are formed by a plurality of closed curves that form the three incidence areas 8A. The surface 80 could be formed by means of pressing or die casting. In addition, the surface 80 could be integrated with the light guide plate 4 or attached onto the incidence area 8A. Moreover, the surfaces 80 could be regularly or irregularly disposed onto the incidence area 8A.

Unlike the prior art that provides open-ended grooves on the light incidence face, the surfaces 80 of the present invention are defined by a plurality of closed curves. Preferably, each closed curves is elliptical, circular, or another shape with endless contours. Moreover, the surfaces 80 should possess approximately 50%~99% of the incidence area 8A. The LEDs 5 is disposed on the side of the incidence area 8A for providing lights that are emitted onto the light guide plate 4. The lights could be uniformly emitted onto the liquid crystal panel 3 from the emission face 12 of the light guide plate 4 by being diffused at the surface 80 of the incidence area 8A.

At the least, an optical sheet 6 should be disposed between the backlight module 2 and the liquid crystal panel 3. The optical sheet 6 could be a prism sheet, diffusion sheet, brightness enhancing sheet, or polarizing sheet. This optical sheet is used to enhance and uniform the lights provided by the backlight module 2, or alter the polarization direction of the lights as desired. Therefore, the liquid crystal panel 3 would possess a better displaying quality.

The LCD 1 could further comprise a reflective sheet 7 disposed under the backlight module 2 for the lights provided from the LEDs 5 to reflect onto the light guide plate 4.

Figure 2:
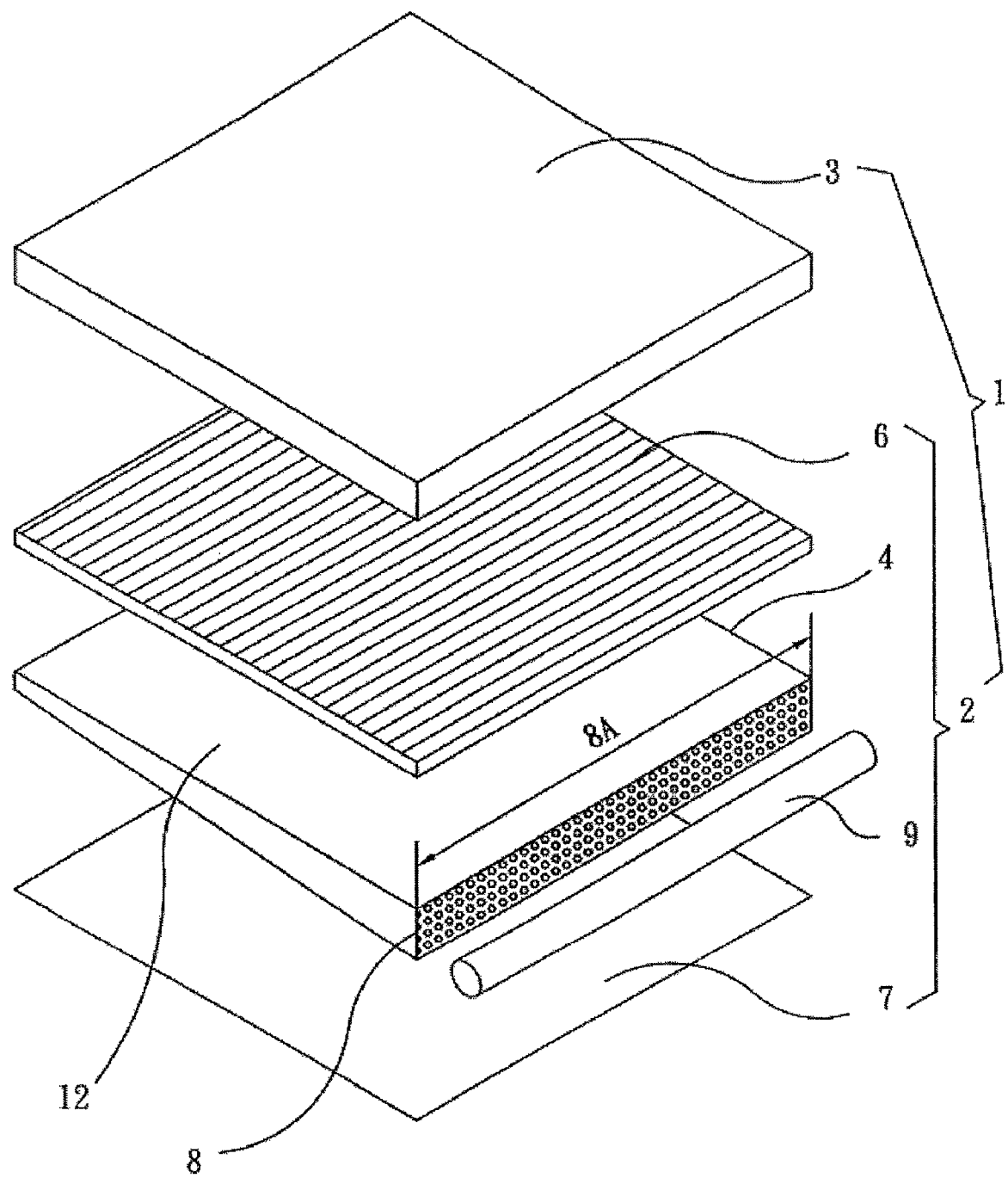
FIG. 2 is a schematic view illustrating the second embodiment of the present invention.

FIG. 2 is an exploded view illustrating another embodiment of the present invention. As compared to the former embodiment, the light source of the present embodiment is an elongated light source covering the area where the whole incidence face 8 exists. The light source is commonly a cold cathode fluorescent lamp 9, which is disposed adjacent to the side of the incidence face 8 of the light guide plate 4, so that the whole incidence face 8 serves as the light incidence area 8A. The formation and distribution of the surfaces 80 in this embodiment are similar to that of the former embodiment.

Figure 3A:
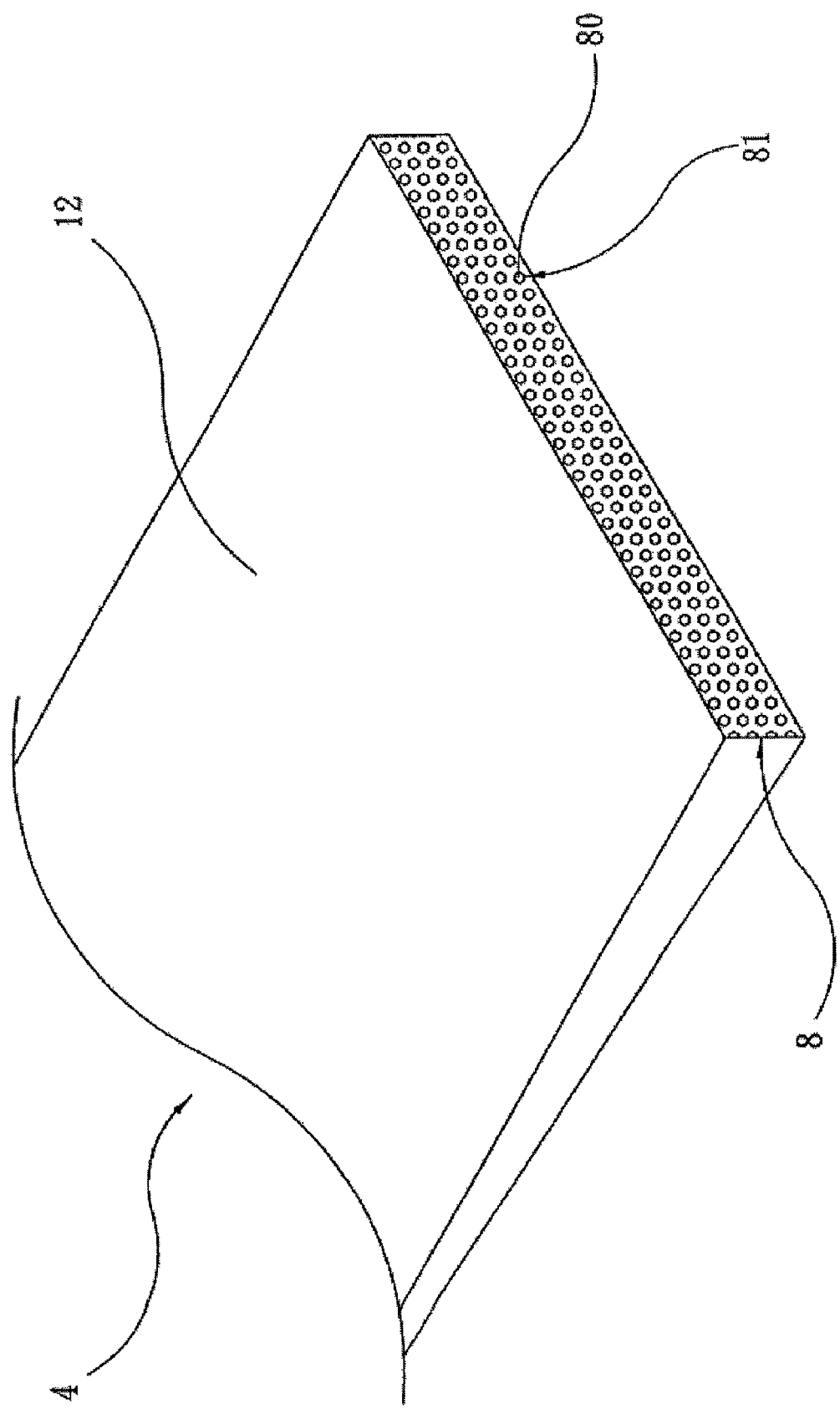
FIG. 3a is a schematic view illustrating the light guide plate in FIG. 2.

FIG. 3a is a schematic view illustrating the light guide plate 4 in FIG. 2. The light guide plate 4 includes the incidence face 8 and the emission face 12 that is substantially perpendicular to the incidence face 8. The whole incidence face 8 is a light incidence area which comprises the surfaces 80 defined by a plurality of closed curves 81. In this embodiment, theses surfaces 80 possess 50%~90% of the incidence face 8.

Figure 3B:
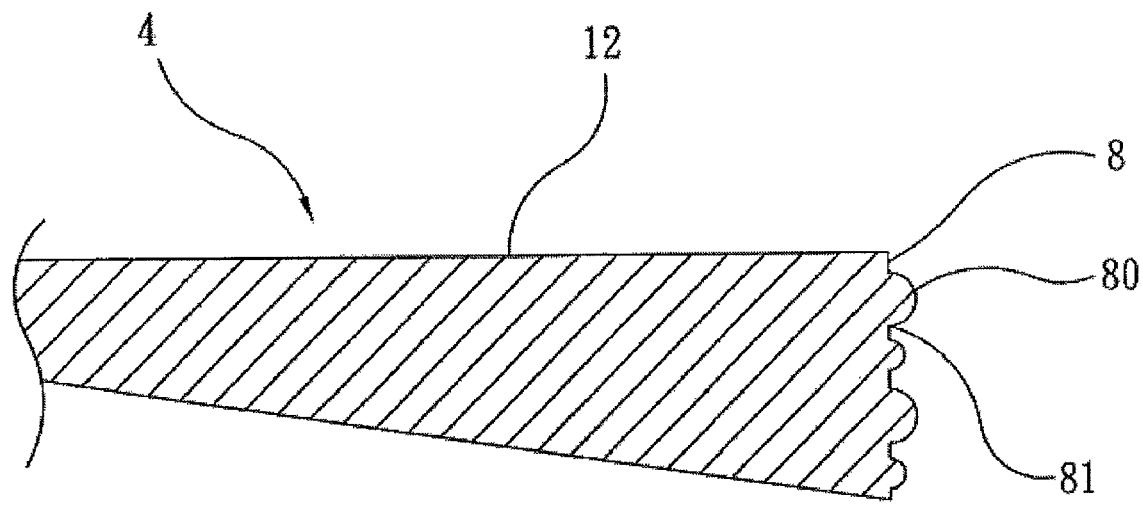
FIG. 3b is a cross-sectional view showing an embodiment of the configuration of the incidence area on the light guide plate of the present invention.

FIG. 3b is a cross-sectional view showing the configuration of the incidence area 8A of the light guide plate 4. The light guide plate 4 has the incidence face 8 and the emission face 12. The incidence face 8 comprises a plurality of surfaces 80 which are convex surfaces formed by at least one annular protrusion. The configurations, distribution densities, distributing and forming manners are disclosed in the description relating to FIG. 1 to FIG. 3a.

Figure 3C:
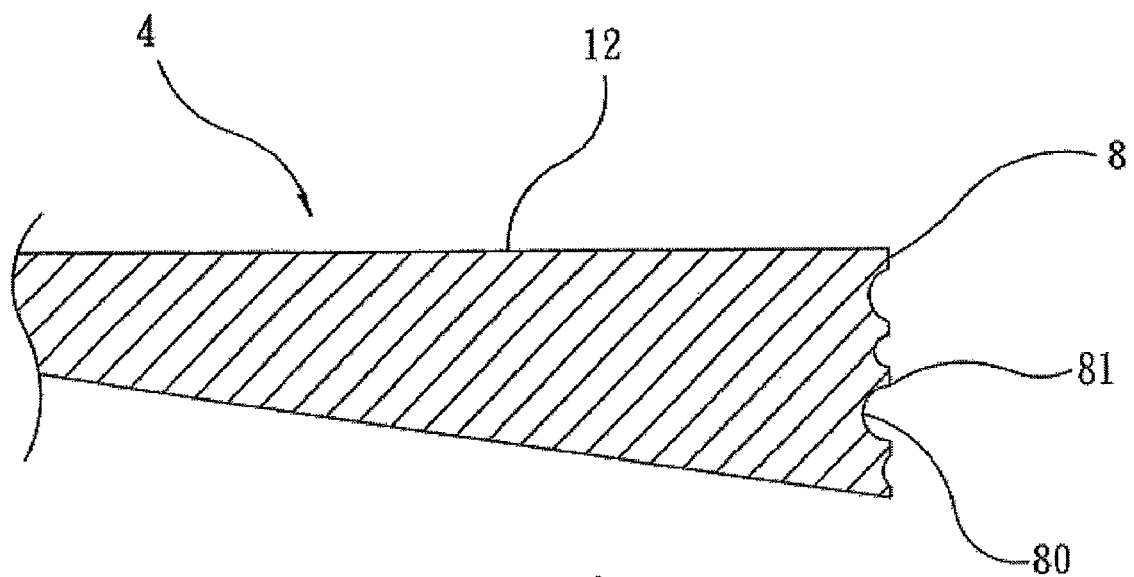
FIG. 3c is a cross-sectional view illustrating another embodiment of the configuration of the incidence area on the light guide plate of the present invention.

FIG. 3c is a cross-sectional view illustrating another embodiment in view of FIG. 3b. Similarly, the light guide plate 4 has the incidence face 8 and the emission face 12. The incidence face 8 comprises a plurality of surfaces 80 which are concave surfaces formed by at least one recess. The configurations, distribution densities, distributing and forming manners are disclosed in the description relating to FIG. 1 to FIG. 3a.

The above disclosures relate to the detailed technical contents and inventive features thereof. It discloses preferable embodiments of the light guide plate, and the backlight module and the LCD comprising the same. People skilled in this field may proceed with a variety of modifications and replacements based on the disclosures and suggestions of the invention as described without departing from the characteristics thereof. For example, dimensions and configurations of the surfaces 80 defined by the closed curves, forming manners, locations, and materials, can be modified as desired. Nevertheless, although such modifications and replacements are not fully disclosed in the above descriptions, they have substantially been covered in the following claims as appended.

What is claimed is:

1. A light guide plate comprising:
    a light incidence face, the light guide plate being tapered from the light incidence face to a side opposite the light incidence face;
    a plurality of incidence areas, each incidence area comprising a plurality of surfaces formed by a plurality of elliptically-shaped closed curves defining protrusions or recesses having different sizes arranged alternately in a matrix arrangement along a first direction and a second direction which is substantially perpendicular to the first direction, wherein each of plurality of incidence areas is spaced apart from adjacent incidence areas by areas devoid of the elliptically-shaped closed curves, and wherein the plurality of incidence areas collectively cover more than half a surface area of the light incidence face, and wherein each incidence area further comprises spacing between the protrusions or recesses where the protrusions or recesses and the spacing are distributed such that the protrusions or recesses cover more than half a surface area of each incidence area; and
    a light emission face substantially perpendicular to the light incidence face, wherein the first direction is perpendicular to the emission face.

2. The light guide plate as claimed in claim 1, wherein the closed curves of the light incidence face forms a plurality of convex surfaces.

3. The light guide plate as claimed in claim 2, wherein the plurality of convex surfaces are irregularly distributed on the light incidence area.

4. The light guide plate as claimed in claim 2, wherein the plurality of convex surfaces are regularly distributed on the light incidence area.

5. The light guide plate as claimed in claim 1, wherein the light guide plate is made of Poly (3-hydroxybutyrate-co-3-hydroxyvalerate) (PMMA).

6. A backlight module, for use in a liquid crystal display, comprising:
    the light guide plate as claimed in claim 1; and
    at least one light source disposed adjacent to the light incidence face.

7. The backlight module as claimed in claim 6, wherein the at least one light source is an LED.

8. The backlight module as claimed in claim 7, wherein the LED is a white LED.

9. The backlight module as claimed in claim 6, wherein the at least one light source is a cold cathode fluorescent lamp.

10. The backlight module as claimed in claim 6, wherein the light guide plate is made of Poly (3-hydroxybutyrate-co-3-hydroxyvalerate) (PMMA).

11. The backlight module as claimed in claim 6, further comprising a reflective sheet disposed under the light guide plate.

12. A display device, comprising:
    a display panel; and
    the backlight module as claimed in claim 6 disposed under the display panel.

13. The display device as claimed in claim 12, further comprising at least one optical sheet disposed between the display panel and the backlight module.

14. The light guide plate as claimed in claim 1, wherein the protrusions or recesses having different sizes arranged alternately are further along a second direction which is substantially perpendicular to the first direction.

* * * * *